No. 771,843. PATENTED OCT. 11, 1904.
C. G. STRUBLER.
CHEESE CUTTER.
APPLICATION FILED MAY 16, 1904.
NO MODEL. 2 SHEETS—SHEET 1.

WITNESSES
INVENTOR
CHARLES G. STRUBLER

No. 771,843. PATENTED OCT. 11, 1904.
C. G. STRUBLER.
CHEESE CUTTER.
APPLICATION FILED MAY 16, 1904.
NO MODEL. 2 SHEETS—SHEET 2.

WITNESSES
INVENTOR
CHARLES G. STRUBLER
BY
ATT'Y.

No. 771,843. Patented October 11, 1904.

UNITED STATES PATENT OFFICE.

CHARLES G. STRUBLER, OF DETROIT, MICHIGAN, ASSIGNOR TO GEORGE H. PAINE, OF DETROIT, MICHIGAN.

CHEESE-CUTTER.

SPECIFICATION forming part of Letters Patent No. 771,843, dated October 11, 1904.

Application filed May 16, 1904. Serial No. 208,229. (No model.)

*To all whom it may concern:*

Be it known that I, CHARLES G. STRUBLER, a citizen of the United States, residing at Detroit, in the county of Wayne and State of Michigan, have invented certain new and useful Improvements in Cheese-Cutters, of which the following is a specification, reference being had therein to the accompanying drawings.

The invention relates to new and useful improvements in cheese-cutters; and it consists particularly in the construction, arrangement, and combination of parts, as more fully hereinafter described, and particularly pointed out in the claims.

Figure 2:
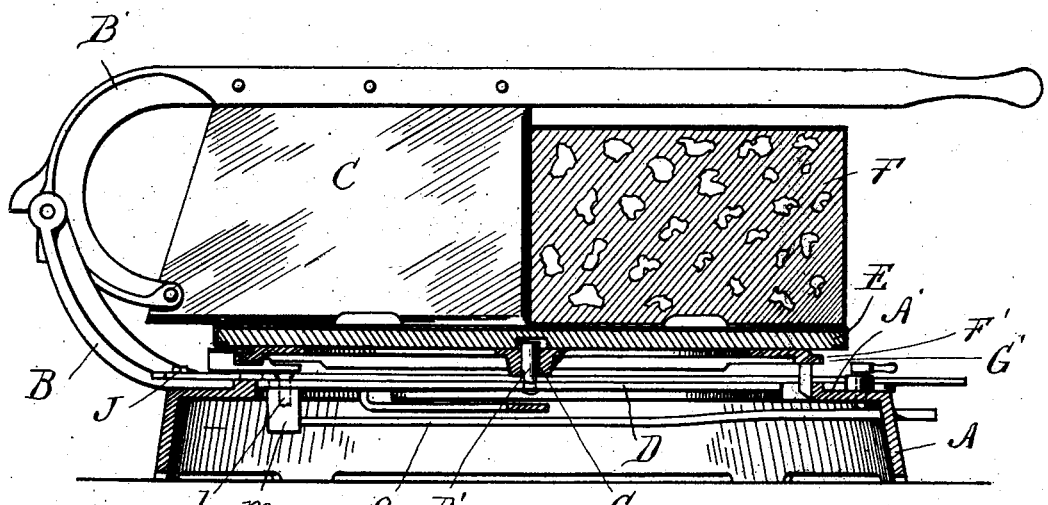
Figure 1:
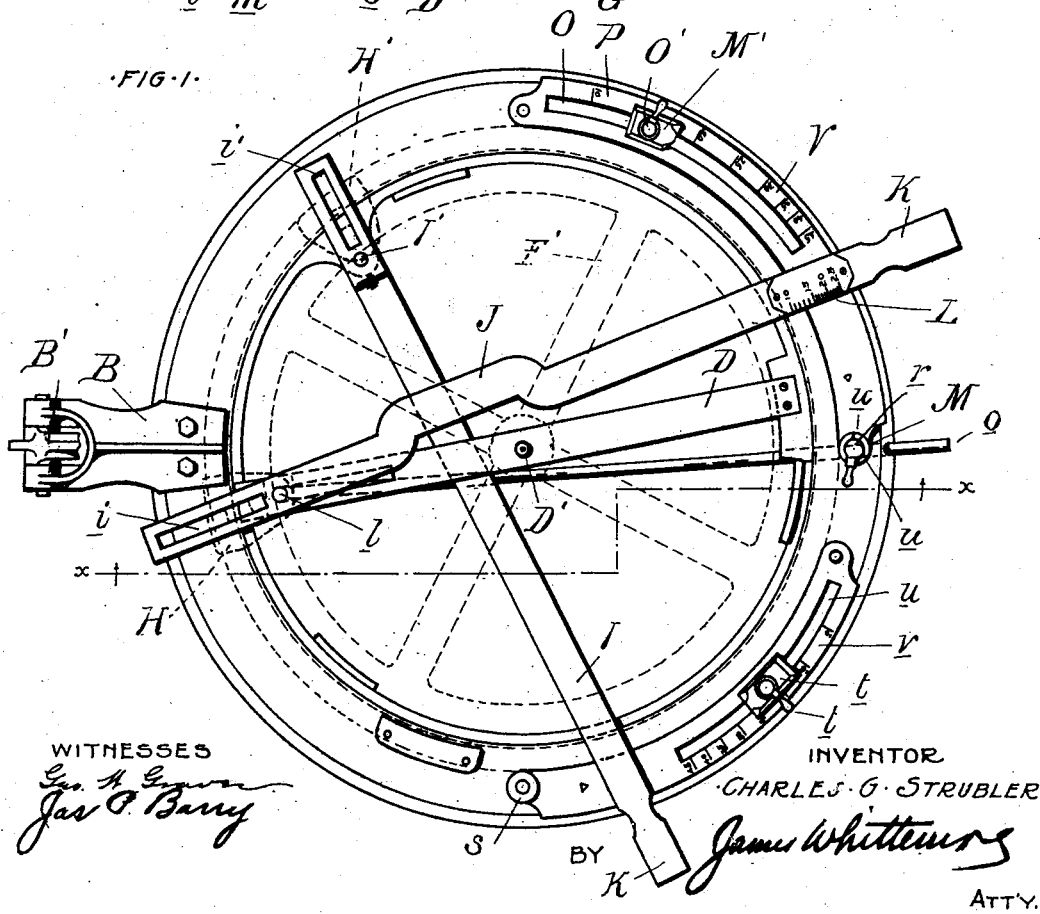
Figures 3, 4:
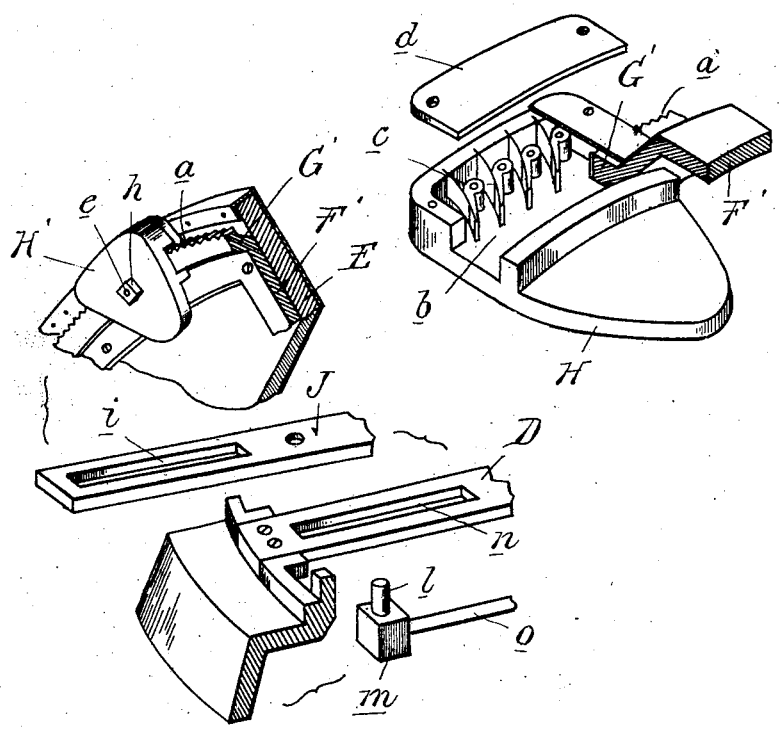

In the drawings, Figure 1 is a plan of the base of operating-levers, cheese-plate and cheese being removed, the frame which supports the cheese being shown in dotted lines. Fig. 2 is a vertical central section through my cheese-cutter on line $x\,x$ in Fig. 1. Fig. 3 is a sectional perspective illustrating part of the base of the adjustable fulcrum, the operating-lever for the price adjustment, and a portion of the cheese-plate with a clutch, these parts being detached and in perspective to illustrate the construction of each and to illustrate their manner of going together; and Fig. 4 is a detached perspective view of the clutch or pawl-box, showing it in connection with a portion of the frame which supports the cheese-plate to illustrate the connection between the two.

A is the base of the machine, which I have shown in shape substantially of a ring-shaped casting, having inwardly-extending flange A' at the top. Upon the rear of this base is the bracket B, in which is journaled the knife-lever B', bearing the knife C for cutting the cheese. Extending transversely across the base is the cross-bar D, in which is secured the pin D', which forms the pivot for the cheese-plate E, upon which rests the cheese F. On the under side of the cheese-plate is a frame F', preferably of metal and preferably of a shape shown in dotted lines in Fig. 1, and this frame is provided with a central hub G, apertured to engage over the pin D'. The frame F' is provided with the marginal flange G', the outer face of which is serrated, as shown at $a$, Figs. 3 and 4. This flange forms, in effect, an annular toothed ring and is on a slightly lower plane than the main body of the frame F'.

H and H' are two pawl-boxes, which act as clutches, by means of which the operating-levers may rotate or partially rotate the cheese-plate and the cheese thereon. These pawl-boxes have formed in them the pawl-chamber $b$, in which are a series of spring-pawls $c$, adapted to engage with the teeth $a$ on the ring or flange G'. Each pawl-box is provided with a cover $d$, which engages over the flange G' and supports the box in position thereon. On the under side of each pawl-box is a pin $e$, on which is loosely secured the nut $h$.

J is a lever pivoted on the pin $l$, which pin is secured to the block $m$ and slides in the slot $n$ in the cross-bar D. Secured to the block $m$ is the rod $o$, which extends through an aperture in the base and is adapted to be adjusted and locked in its adjusted position by means of the clamping-screw $r$. The upper end of the pin $l$ is secured to the lever J by being headed or upset, as shown in Fig. 2. The lever J is provided with the slot $i$, with which a nut or squared block $h$ on the under side of the pawl-box H' is adapted to be engaged.

I is a lever journaled on the stationary pin I' on the base of the machine. This lever has the slot $i'$ in its short arm, with which the nut or squared block $h$ on the pawl-box H' is adapted to engage, this part $h$ being the same as described on the pawl-box H. The lever I extends beyond the edge of the base and is provided with a suitable operating-handle K. It is adapted to be moved over the base between the stationary stop $s$ and the adjustable stop $t$, secured by a clamp-screw $t'$. This adjustable stop $t$ is movable in the segmental slot $u$ in the top of the base, and beside the slot is provided a scale $v$, having marked therein at proper points the various weights which cheese placed upon the cheese-plate may have.

The lever J is provided at its outer end with the handle K' and is provided on its face with the scale L, indicating prices per pound. In this instance I have shown a scale as running from ten cents to twenty-five cents a pound. The lever J is adapted to be moved between the stationary stop M and the adjustable stop M'. The adjustable stop M' is movable in a slot O in the top of the base and is adapted to be secured by a suitable clamping-screw O' at any point of adjustment. Beside the slot is a scale V, indicating weights of the cheese.

The parts being thus constructed, their operation is as follows: The operator weighs the cheese and then places it upon the cheese-plate, as shown in Fig. 2. He then adjusts the two blocks M' and t to a point opposite the point in their respective scales equal to the weight of the cheese. For instance, I have shown the block M' as adjusted to a cheese which would weigh eighteen pounds, while I have shown the block t adjusted to a cheese which would weigh slightly over twenty pounds. When the device is to be used, however, the two adjustable blocks M' and t should be adjusted to the same weight indication. The lever K being pivoted on a fixed point, but having a variable movement due to the adjustment of the block t, will vary the throw or travel of the cheese-plate according to the distance between the bell-stop s and the block t, and in practice I prefer to arrange this distance in connection with the scale v, so that each throw of the lever K between its two stops for any given weight of cheese will rotate the cheese in relation to the knife, so as to cut off a quarter of a pound. Of course if the scale v is changed it may be arranged so that each throw of the lever K will move the cheese to cut off half a pound or any other desired fraction, so that the lever having a throw for one-quarter pound, if a customer coming in desires half a pound of cheese the operator simply reciprocates the lever K twice between its fixed stops and then operates the knife. The cheese having been previously cut by the knife the operation of the knife will sever a piece of cheese which will weigh half a pound. For three-quarters of a pound the lever would be moved three times. Of course with the operation of this lever the storekeeper has to figure the price of the cheese which he cuts off, and in order to save this figuring and to give the desired weight of cheese for any given price per pound, I employ the lever J. As previously described, the lever J has the scale L, and when the storekeeper has a cheese weighing, say, eighteen pounds, which he desires to sell at fifteen cents a pound, he sets the movable block M', as shown in Fig. 1, at "18," and then loosening the clamping-screw r he moves the rod o in or out, which through the block m and the pin l will adjust the lever J likewise in or out, changing the relative lengths of the long and short arms thereof. In this case he would adjust the lever J until the scale L has the fifteen-cent mark opposite the setting-mark u on the journal-bearing u' for the set-screw r. When thus adjusted, the clamping-screw r is tightened against the rod o, and then the lever J if reciprocated between the fixed stop and the block M' will move the cheese so that the knife will cut off a fixed value for each reciprocation. In this case, as is usual in such constructions, I prefer to have each reciprocation of the lever move the cheese so that the knife will cut off five cents' worth. If the purchaser wished fifteen cents' worth, the lever J would be reciprocated three times, &c. This second lever is useful also in case a customer comes in and says he wants, say, twenty-five cents' worth of cheese, and in that case the operator reciprocates the lever J five times between the two stops, and the proper value of cheese will be cut off by the knife and delivered to the customer.

What I claim as my invention is—

1. The combination of a base, a rotary cheese-plate journaled thereon, two independent levers for actuating the cheese-plate and clutches on each lever acting to grasp the plate to move it forward, and to both dog its backward movement.

2. In a cheese-cutter, the combination with a base, a stationary cross-bar having a slot therein, an operating-lever, a cheese-plate which the operating-lever is adapted to move, means for adjusting the fulcrum and the operating-lever, a clutch having a fixed relation to the cheese-plate, and a sliding connection between the lever and clutch.

3. In a cheese-cutter the combination of a base, a rotary cheese-plate thereon, an operating-lever, a pawl-box having a fixed radial relation to the cheese-plate and adapted to be reciprocated by the lever, a sliding connection between the pawl-box and the lever, and means for simultaneously adjusting the fulcrum of the lever and the lever.

4. In a cheese-cutter, the combination of a base, a rotary cheese-plate journaled thereon, having a notched ring, a pawl-box supported on the notched ring, an actuating-lever, having a slot engaging a bearing on said pawl-box, and means for adjusting the lever and its fulcrum in relation to said pawl-box, substantially described.

5. The combination of a base, a rotary cheese-plate journaled thereon and two independent levers for actuating the cheese-plate, each lever having a series of spring-pawls and a notched ring on the cheese-plate with which the pawls of both levers engage, the pawls of one lever acting as back-stops while the other lever is acting to move the plate.

6. In a cheese-cutter, the combination of a base, a rotary cheese-plate thereon, the frame F' supporting the cheese-plate, the flange G' on the frame having a notched margin, a pawl-box supported to slide on said flange, the pawls in the box, and a lever for reciprocating the pawl-box.

7. In a cheese-cutter, the combination of a base, a rotary cheese-plate thereon, a notched flange on said cheese-plate, the pawl-box having a sliding engagement therewith, the pawls thereon, a movable squared block on the pawl-box, a lever for operating the pawl-box having a slot in which the squared block is adapted to engage.

In testimony whereof I affix my signature in presence of two witnesses.

CHARLES G. STRUBLER.

Witnesses:
H. C. SMITH,
JAS. P. BARRY.